VICTOR SHANOK
JESSE P. SHANOK
INVENTOR

BY Friedman & Goodman
ATTORNEYS

United States Patent Office 3,687,794
Patented Aug. 29, 1972

3,687,794
COMBINATION DECORATIVE AND SAFETY COMPOSITE MOLDING
Victor Shanok and Jesse P. Shanok, Brooklyn, N.Y., assignors to Glass Laboratories Company, Brooklyn, N.Y.
Continuation-in-part of application Ser. No. 788,578, Jan. 2, 1969, now Patent No. 3,590,768. This application Mar. 9, 1971, Ser. No. 122,360
Int. Cl. B44f 1/00, 7/00; B60q 1/26
U.S. Cl. 161—5
12 Claims

ABSTRACT OF THE DISCLOSURE

A combination decorative and safety composite molding intended for use as border trim for an automobile rear window or at some other such advantageous location wherein said composite molding, which includes a strip of metallic foil, during daylight simulates the appearance of chromium trim and at night has a strip of light reflective material and an associated strip of transparent colored material which reflect light impinging thereon to thereby provide a significant safety function, said strips being encapsulated with a shell of transparent thermoplastic material.

CROSS-REFERENCE TO RELATED APPLICATIONS

This application is a continuation-in-part of our copending United States application Ser. No. 788,578, filed Jan. 2, 1969, now Patent No. 3,590,768.

BACKGROUND OF THE INVENTION

The present invention relates generally to edge trimming material, and more particularly to an attachable composite molding or trim for an automobile window or the like which provides different daylight and night time visual appearances.

For purposes of illustration only, and not necessarily as a limitation of use, the composite molding hereof is advantageously attached as border trim along the edge of an automobile rear window, such trim being commonly referred to as reveal molding and, in this attached position, makes a significant contribution not only to the appearance of the automobile but also in providing a visual safety signal to an approaching automobile. An effective safety signal naturally requires the use of a bright, highly visible color; yet such signal cannot be permitted to detract from the appearance of the automobile. In known prior art trims or the like, however, the visual appearance of the trim is at all times essentially the same and thus these prior art edge trims cannot adequately function as a safety signal device without noticeably detracting from the car's appearance, or vice versa.

SUMMARY OF THE INVENTION

Broadly, it is an object of the present invention to provide an improved composite molding, particularly for use as border trim about a car rear window, overcoming the foregoing and other shortcomings of the prior art. Specifically, it is an object to provide an automobile rear window reveal molding edge trim having different colored materials of construction which during daylight and night time provide different visual appearances.

It is, therefore, among one of the principal objectives of this invention to provide an improved colored light reflective composite which is simultaneously asthetically pleasing and functionally useful.

An automobile combination decorative and safety composite molding demonstrating objects and advantages of the present invention includes a superposed arrangement of plastic-encapsulated wide and narrow strips, the wide strip effectively providing a simulated appearance, during daylight, of conventional chromium trim as is usually provided on automobiles, and the narrow strips, at night, effectively reflecting any light impinging thereon and thereby serving a significant safety function. In a preferred embodiment, the improved composite molding hereof is in the shape of a rectangular frame and positioned over the rear window reveal molding.

In accordance with the present invention there has now been provided an improved colored light reflective composite molding comprising a wide strip of metallic foil, a narrow strip of transparent colored material, a narrow strip of light reflective material intermediate said strips of metallic foil and transparent colored material, said strips being encapsulated within a shell of transparent thermoplastic material. It has been found, surprisingly, that placing the strip of light reflective material between the metallic foil and transparent colored material causes the color of the colored material to become brightly sharpened in intensity.

BRIEF DESCRIPTION OF THE DRAWINGS

Having in mind the above and other objects that will be evident from an understanding of this disclosure, the invention comprises the devices, combinations and arrangements of parts as illustrated in the presently preferred embodiment of the invention which is hereinafter set fourth in such detail as to enable those skilled in the art readily to understand the function, operation, construction and advantages of it, when read in conjunction with the accompaying drawings in which.

DESCRIPTION OF THE PREFERRED EMBODIMENT

Figure 1:
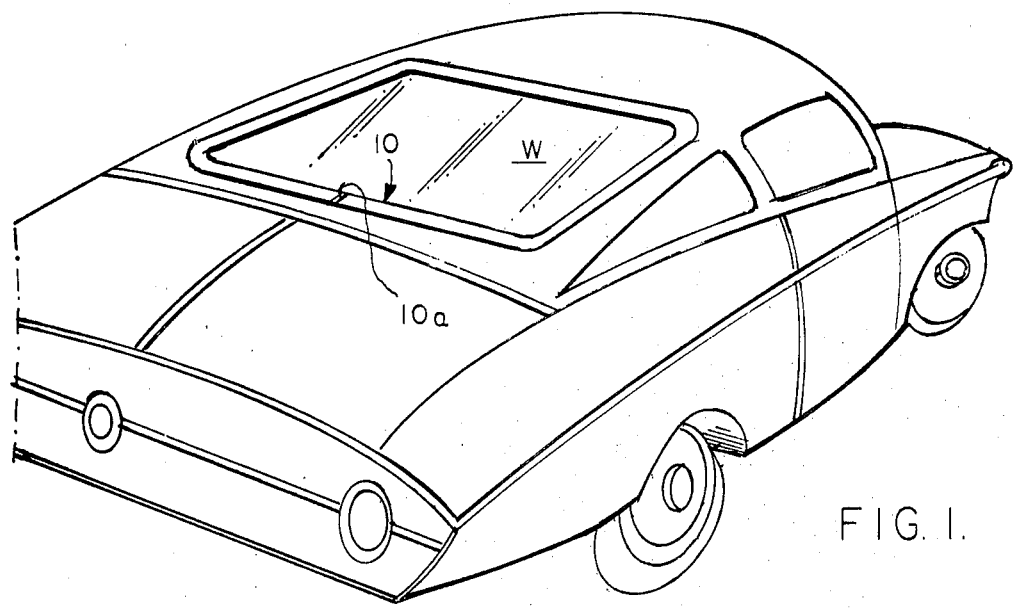
FIG. 1 illustrates a composite molding according to the present invention in the form of a rectangular frame and in a preferred operative position over the bordering trim or so-called reveal molding of the rear window of an automobile.
Figures 2, 3:
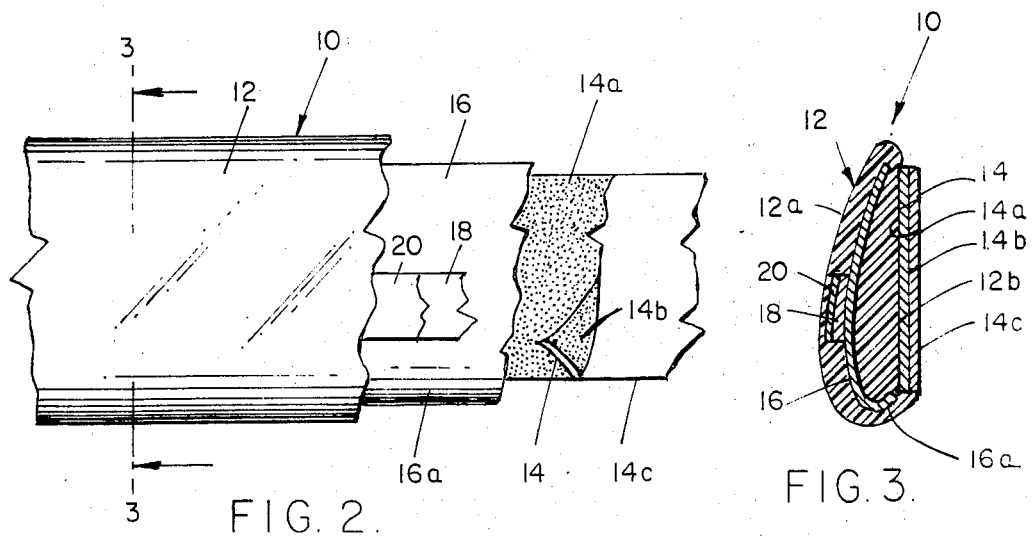
FIG. 2 is an isolated plan view of the composite molding, on an enlarged scale, with external portions thereof successively broken away to better illustrate the internal construction of the strip.
FIG. 3 is an enlarged side elevational view, in section taken on line 3—3 of FIG. 2, illustrating further structural details of the composite molding.

Reference is now made to the drawings wherein there is shown a composite molding, generally designated 10 the structural details of which are best illustrated in FIGS. 2, 3 while FIG. 1 illustrates a significantly advantageous position for the composite molding wherein it is shaped as a rectangular frame and placed over the bordering trim or so-called reveal molding of the rear window of an automobile. That is, an appropriate length of the composite molding 10 is formed into a rectangular frame, the two ends abutting at 10a, and then used in accordance with the present invention as a covering for the reveal molding of the automobile rear window W.

Reference is now made to FIGS. 2, 3, which best illustrate the preferred embodiment of a composite molding 10 according to the present invention. The composite molding 10 will be understood to be an extruded article of manufacture, in the extrusion of which selected materials are encapsulated in a transparent plastic body. An embodiment of extruding apparatus which may be used in the fabrication of the composite molding 10 is described in U.S. Patent 3,245,864. More particularly, the extruding die of the apparatus is appropriately shaped to provide the encapsulating plastic body 12 having the cross-sectional shape as is more particularly illustrated in FIG. 3 including a curved upper surface 12a and a bottom surface having an elongated channel formed by a flat wall 12b. In a preferred embodiment, use was made of a double-sided adhesive strip 14 arranged with one side 14a adhesively secured to the flat wall 12b and the other side 14b available for adhesive securement or attachment of the composite molding 10 to the automobile. As generally understood, adhesive surface 14b has a protective backing strip 14c provided with an appropriately treated surface which permits ready release from the adhesive surface 14b preparatory to attachment of the composite molding 10 to the automobile.

In accordance with the present invention, encapsulated within the plastic body 12 during extrusion thereof, are selected materials which contribute to the functioning of the strip 10 as a decorative strip and also as a strip having a significant safety function. One such material is an elongated strip 16 of a metallic foil, preferably aluminum foil, which has the necessary silver, shiny appearance to realistically simulate the appearance of chromium trim such as is commonly used as decoration for automobiles, particularly as border trim for the rear window W. Strip 16, as clearly illustrated in FIG. 3, is disposed in substantially parallel relationship to the curved edge 12a and includes a curved end 16a which in following the curvature of surface 12a at the widest portion of the body 12 extends transversely of the body 12.

The second selected material is a strip 18 of light reflective material, which is disposed in superposed position along the foil 16 such that both strips 16, 18 are visible to an observer looking through the surface 12a. In a preferred embodiment, the width of strip 16 is approximately five eighths of an inch and that of strip 18 is one quarter inch. By virtue of the smaller size of the strip 18 relative to the foil 16, it has been found that during daylight the essential appearance of the composite molding 10 is the appearance provided by the foil 16, namely, an appearance which realistically simulates the appearance of chromium trim of an automobile. At night, however, when a car approaches a car having the composite molding 10 from the rear, the light from this approaching car impinges on the composite molding 10 and is reflected by the strip 18. The reflected light produces a visible rectangle on the rear of the car and this, of course, helps call attention of the driver of the approaching car to the presence of the car having composite molding 10 thereon and thus serves a significant safety function, wherein the visible rectangle is preferably red when viewed as set forth hereinafter below.

The third selected material is a strip 20 of transparent colored material. In accordance with the invention, the strip 18 of light reflective material is disposed intermediate the strip 16 of metallic foil and the strip 20 of transparent colored material. Preferably, the strip 20 has a width substantially equal to the width of the strip 18. The effect of this intermediate disposition is to sharply brighten the hue of the particular color of the colored strip 20 disposed thereover. For example, if the strip 20 has an ordinary red color, when viewed over the reflector strip 18, it becomes a bright red; ordinary green becomes bright green; ordinary blue becomes bright blue; ordinary yellow becomes bright yellow, and so forth. Similarly, if the strip 20 is a bright red it becomes a brighter red, and so forth. Thus, not only is the molding particularly pleasing to the eye, but because of the brighter hue of the color reflected back, it can serve to draw attention to that which the molding attached, e.g., edge trim for automobiles, highway signs, advertising signs, etc.

The thermoplastic material forming the body 12 is a synthetic resin such as vinyl chloride or cellulose acetate butyrate, while the metallic foil 16 encased therein is usually aluminum foil, as set forth above. The strip of light reflective material is any one of those commercially available in which light impinged thereon will be reflected back to the viewer, such as a reflective tape. The strip of transparent colored material 20 may be preferably any suitable plastic such as cellulose acetate, or even vinyl chloride or cellulose acetate butyrate, less preferably glass, but preferably being of red color when used in accordance with the present invention which functions as a covering for the reveal molding of the automobile rear window W.

Strip 18 of light reflective material, as mentioned, is disposed in superposed position along the strip of metal foil 16 in a manner such that both strips 16 and 18 are visible to the viewer looking through the surface 12a. In turn, the strip 20 of colored material is disposed in superposed position along the strip 18. Preferably, the strip 18 is formed of a light reflective material which reflects clear or white light since this has been found to yield the best results. By providing a reflective material which reflects a color such as red, preferably using a red reflective tape, particularly interesting hues can be achieved by varying the colors of the colored strip 20. However, it has been found that the percent of colored light reflected back by the clear light reflective material is greatly increased over that reflected back by the colored light reflective material.

Numerous alterations of the structure herein disclosed will suggest themselves to those skilled in the art. However, it is to be understood that the present disclosure relates to a preferred embodiment of the invention which is for purposes of illustration only, and not to be construed as a limitation of the invention.

What is claimed is:

1. A combination decorative and safety composite molding comprising a first elongated strip of metallic foil of a prescribed width having an appearance of chromium trim, a second elongated strip of transparent material, a third elongated strip fabricated of a light reflective material having a lesser width than said first elongated strip and disposed intermediate said first and second strips of metallic foil and transparent material respectively in a superposed position on said first elongated strip, an elongated transparent plastic body in an encapsulating position about said first, second and third strips, and securing means to attach said composite molding to a member with said first, second and third elongated strips exposed to view, whereby during daylight said composite molding visually simulates chromium trim of the member and at night has a safety function by reflecting light impinging thereon.

2. A composite molding according to claim 1, wherein said third strip of light reflective material is colored light reflecting.

3. A composite molding according to claim 1, wherein said second strip of transparent material is colored.

4. A composite molding according to claim 3, wherein said third strip of light reflective material is of a clear reflective type so that when said composite molding is exposed to a source of light the color of said second strip of transparent colored material will effect a brighter hue.

5. A combination decorative and safety composite molding for use on an automobile reveal molding comprising a first elongated strip of metallic foil of a prescribed width having an appearance simulating an appearance of chromium trim of an automobile, a second elongated strip of transparent material, a third elongated strip fabricated of a light reflective material having a lesser width than said first elongated strip and disposed intermediate said first and second strips of metallic foil and transparent material respectively in a superposed position on said first elongated strip, said first, second and third elongated strips being substantially of equal length, an elongated transparent plastic body in an encapsulating position about said first, second and third strips, and securing means to attach said composite molding to an automobile with said first, second and third elongated strips exposed to view, whereby during daylight said composite molding visually simulates chromium trim of said automobile and at night has a safety function by reflecting light impinging thereon.

6. A composite molding according to claim 5, wherein said composite molding includes an elongated channel to receive said securing means.

7. A composite molding according to claim 5, wherein said third elongated strip is less than one-half the width of said first elongated strip.

8. A composite molding according to claim 5, wherein said first elongated strip is fabricated of aluminum foil and said third elongated strip is fabricated of red reflective material.

9. A composite molding according to claim 5, wherein said securing means includes a double-sided adhesive strip with one side thereof adhesively secured to said plastic body and effective to make adhesive attachment with an opposite side thereof to said automobile.

10. A composite molding according to claim 5, wherein said second strip of transparent material is colored.

11. A composite molding according to claim 10, wherein said third strip of light reflective material is of a clear reflective type so that when said composite molding is exposed to a source of light the color of said second strip of transparent colored material will effect a brighter hue.

12. A composite molding according to claim 11, wherein said second strip of transparent material is red colored to contrast with said first elongated strip.

References Cited
UNITED STATES PATENTS

| | | | |
|---|---|---|---|
| 2,931,119 | 4/1960 | Gits et al. | 161—5 |
| 3,440,129 | 4/1969 | Anselm | 161—5 |
| 3,509,001 | 4/1970 | Shanok et al. | 161—5 |

DOUGLAS J. DRUMMOND, Primary Examiner

U.S. Cl. X.R.

116—28; 52—315; 161—213, 406